UNITED STATES PATENT OFFICE.

FREDERICK H. PATCH, OF RICHMOND, VIRGINIA.

ADHESIVE AND PROCESS OF MAKING SAME.

No. 809,739.  Specification of Letters Patent.  Patented Jan. 9, 1906.

Application filed April 14, 1905. Serial No. 255,539.

*To all whom it may concern:*

Be it known that I, FREDERICK H. PATCH, a citizen of the United States, residing at Richmond, in the county of Henrico and State of Virginia, have invented certain new and useful Improvements in Adhesives and Processes of Making Same, of which the following is a specification.

The object of my said invention is to utilize the waste liquor from pulp-mills or from the manufacture of fiber from any fibrous material, known as sulfite liquor, by making the same into an adhesive of commercial value. Many attempts have been made to utilize said waste, but all products heretofore made from evaporated sulfite liquor absorb moisture when exposed to dampness and crumble, thus destroying the commercial value thereof.

My said invention consists, therefore, in combining sulfite liquor with oil for the purpose of preventing it from taking up moisture.

Oil in its natural state and sulfite will not combine; but I have discovered that by combining oil with another substance which will reduce the mixture to substantially the specific gravity of the evaporated sulfite liquor said mixture and the sulfite will combine and in a permanent manner. I have found that by mixing the oil with resin until the combination is of substantially the same specific gravity as the sulfite the mixture will then combine with said sulfite and render the product impervious to moisture, and thus overcome the objection above noted. In practice I combine the several ingredients by heat; but they may be combined by allowing them to stand until all are thoroughly dissolved. Heating the mixture is the preferred way, however, and may be done with steam, in a vacuum-pan, or by direct heat. The oils used may be any suitable mineral or animal oil, and in practice I have found linseed-oil to give very satisfactory results. Other oils may, however, be used, and other substances than resin may be found to serve as its equivalent. I combine said several substances in substantially the proportions and in the manner as follows: four pints of evaporated sulfite liquor, one pint of oil, and twelve ounces of resin. The oil and resin are first mixed, as above stated, the resin being melted by heat or dissolved in the oil, and then the mixture is combined with the sulfite, preferably also under heat.

A very effective and inexpensive adhesive compound is thus produced, suitable for use in making cores for castings and all other uses where an adhesive is desired for binding sand together, and also in many other places where such an adhesive may be found useful. Thus a large quantity of waste material heretofore found difficult to use to any advantage may be saved and converted into a useful product of commercial value.

Having thus fully described my said invention, what I claim as new, and desire to secure by Letters Patent, is—

1. The process of making an adhesive from evaporated sulfite liquor which consists in combining therewith a mixture of oil and resin, substantially as set forth.

2. The process of making an adhesive from evaporated sulfite liquor which consists in mixing a quantity of resin with a quantity of oil until the mixture is of substantially the same specific gravity as the sulfite and then mixing said mixture with said sulfite, substantially as set forth.

3. An adhesive composed of sulfite liquor combined with a mixture of oil and resin, substantially as set forth.

4. An adhesive consisting of a mixture of sulfite liquor, oil and resin in substantially the proportions set forth.

5. The process of treating evaporated sulfite liquor which consists in mixing therewith a quantity of oil, which has previously been combined with a substance that will combine with said sulfite, substantially as set forth.

In witness whereof I have hereunto set my hand and seal, at Washington, District of Columbia, this 10th day of April, A. D. 1905.

FREDERICK H. PATCH. [L. S.]

Witnesses:
 HAZEL NORDEMAN,
 E. W. BRADFORD.